United States Patent [19]

Yoshida et al.

[11] Patent Number: 5,506,303
[45] Date of Patent: Apr. 9, 1996

[54] PROCESS FOR PREPARING A LIQUID SILICONE RUBBER BASE COMPOSITION

[75] Inventors: Takeo Yoshida; Masanobu Miyakoshi, both of Annaka; Hironao Fujiki, Takasaki; Shiniti Ide, Annaka, all of Japan

[73] Assignee: Shin-Etsu Chemical Co., Ltd., Tokyo, Japan

[21] Appl. No.: 254,828

[22] Filed: Jun. 6, 1994

[30] Foreign Application Priority Data

Jun. 17, 1993 [JP] Japan .................................... 5-171052

[51] Int. Cl.⁶ ....................................................... C08K 3/00
[52] U.S. Cl. ............................................. 524/847; 524/862
[58] Field of Search .................................... 524/847, 862

[56] References Cited

U.S. PATENT DOCUMENTS 4,649,005  3/1987  Kobayashi et al. ..................... 264/101
5,217,651  6/1993  Nagaoka ..................... 528/12

FOREIGN PATENT DOCUMENTS 428008  5/1992  Japan .

OTHER PUBLICATIONS

"JIS K 6301" translated and published by Japanese Standards Association; 1975.

Primary Examiner—Melvyn I. Marquis
Assistant Examiner—Karen A. Dean
Attorney, Agent, or Firm—Lowe, Price, LeBlanc & Becker

[57] ABSTRACT

A process for preparing a liquid silicone rubber base composition of the type which comprises (A) an organopolysiloxane of the following average compositional formula (1)

$$R_aSiO_{(4-a)/2} \quad (1)$$

wherein each R independently represents an unsubstituted or substituted monovalent hydrocarbon group and a is a value of from 1.95 to 2.05, and (B) a finely divided silica filler is described. The process comprises the steps of mixing a first portion of the ingredient (A) and the ingredient (B) at a temperature not higher than 80° C., further mixing a second portion of the ingredient (A) with the mixture obtained in the first step at a temperature not higher than 80° C. and subjecting the resultant mixture to thermal treatment at a temperature of 130° to 200° C. By this, the base composition has good fluidity and is able to yield a cured product having good tear strength under stress.

9 Claims, No Drawings

PROCESS FOR PREPARING A LIQUID SILICONE RUBBER BASE COMPOSITION

BACKGROUND OF THE INVENTION

1. Field of the Invention

This invention relates to a process for preparing a liquid silicone rubber base composition which is useful as a starting material for silicone rubber which has utility in the fields of electric and electronic industries, automobiles, business machines, and medical appliances.

2. Description of the Prior Art

In known liquid silicone rubber base compositions, it is the usual practice to add fillers, such as dry or wet process silica having a large specific surface area, in large amounts in order to develop high mechanical strength of cured silicone rubber. However, if fillers are added in large amounts, the fluidity of the resultant liquid silicone rubber base composition is worsened. This makes it impossible to obtain liquid silicone rubber bases having good moldability.

For increasing the fluidity of the liquid silicone rubber base, several processes have been used including a process wherein wetting agents are added so as to improve the wettability of the base, a process wherein the rubber base is diluted with base oils, and a process of adding inorganic fillers under high temperature conditions.

In the process wherein wetting agents are added, there are used, as a wetting agent, hexamethyldisilazane, cyclic dimethylsiloxane, polydimethylsiloxanes having a degree of polymerization of not higher than 30 and terminated with a hydroxyl group at ends thereof, and alkoxy group-containing silanes or alkoxy group-containing siloxanes.

As the process wherein base oils are used for dilution, there is mentioned a process wherein reinforcing silica is formulated in organopolysiloxane in large amounts and thermally treated, followed by dilution with base oils.

For the process wherein inorganic fillers are added under high temperature conditions, there is known a process wherein an inorganic filler is added to and kneaded along with a rubber base at a temperature of from 200° to 300° C. by use of a biaxial extruder, and then thermally treated. This process is set out, for example, in U.S. Pat. No. 4,649,005 corresponding to Japanese Patent Publication (examined) No. 4-28008.

The liquid silicone rubber base compositions obtained according to the prior art processes have, respectively, fluidity sufficient for practical applications and enable one to produce cured products which have a tear strength of not lower than 20 kgf/cm. However, these processes have the problem that once the product has been cracked, the cracks are readily spread in a tensile stress condition, resulting in the breakage of the product within a short time.

SUMMARY OF THE INVENTION

It is therefore an object of the invention to provide a process for preparing a liquid silicone rubber base composition which can overcome the problem of the prior art.

It is another object of the invention to provide a process for preparing a liquid silicone rubber composition which has good fluidity and is capable of yielding a cured product which exhibits a good tear resistance under conditions where the cured product suffers cracks.

The above objects can be achieved, according to the invention, by a process for preparing a liquid silicone rubber base composition which comprises (A) an organopolysiloxane of the following average compositional formula (1)

$$R_aSiO_{(4-a)/2} \qquad (1)$$

wherein each R independently represents an unsubstituted or substituted monovalent hydrocarbon group and a is a value of from 1.95 to 2.05. the organopolysiloxane having a viscosity ranging from 500 to 100,000 centipoises at 25° C. and having at least two crosslinkable groups in the molecule, and (B) a finely divided silica filler dispersed in the organopolysiloxane and having a specific surface area not smaller than 50 m²/g, the process comprising:

the first step of mixing or kneading a first portion of the organopolysiloxane (A) of the average compositional formula (1) with the finely divided silica filler (B) at temperature not higher than 80° C. until a uniform dispersion is obtained;

the second step of further mixing or kneading a second portion of the organopolysiloxane (A) of the average formula (1) with the resultant mixture at a temperature not higher than 80° C. until a uniform dispersion is obtained; and the third step of subjecting the mixture obtained in the second step to thermal treatment at a temperature of 130° C. to 200° C.

It is preferred that the ratio by weight between the organopolysiloxane (A) and the silica filler (B) in the first step is in the range of from 30:70 to 70:30. It is also preferred that the ratio by weight between the first portion of the organopolysiloxane used in the first step and the second portion used in the second step is in the range of from 30:70 to 70:30.

DETAILED DESCRIPTION AND EMBODIMENTS OF THE INVENTION

First, the respective ingredients used in the process of the invention are described.

(A) Organopolysiloxanes

The organopolysiloxane of ingredient (A) is a base polymer of a liquid silicone base rubber composition and is of the following average compositional formula (1)

$$R_aSiO_{(4-a)/2} \qquad (1)$$

wherein R and $\underline{a}$ have, respectively, the same meanings as defined hereinbefore.

Among all R groups in the organopolysiloxane, at least two groups should be an alkenyl group or hydroxyl group. More particularly, when the base composition obtained by the process of the invention is mixed with a crosslinking agent, these groups serve as a crosslinking site and react with the crosslinking agent, thereby forming a cured product. The alkenyl group includes one which has 2 to 4 carbon atoms and is, for example a vinyl group, an allyl group, an iso-propenyl group, a butenyl group or the like.

The R groups other than the crosslinking group should be an unsubstituted or substituted monovalent group which is free of any aliphatic unsaturation bond. Examples of the group include an alkyl group having from 1 to 8 carbon atoms such as a methyl group, an ethyl group, a propyl group, a butyl; group, an iso-butyl group, a t-butyl group, a pentyl group, an iso-pentyl group, a hexyl group, an octyl group, an iso-octyl group or the like, a cycloalkyl group having from 5 to 8 carbon atoms such as a cyclopentyl group, a cyclohexyl group, a cyclooctyl group or the like, an aryl group having 6 to 12 carbon atoms such as a phenyl group, a tolyl group, a benzyl group or the like, and those groups indicated above but substituted at at least a part of the hydrogen atoms thereof with a halogen atom such as chlorine, fluorine or the like, e.g. a chloromethyl group, a 3,3,3-trifluoropropyl group, a 3-chloropropyl group or the like.

The organopolysiloxane may be linear or branched in nature or may be in the form of a copolymer comprising linear polymer units and branched polymer units. Alternatively, the organopolysiloxane may be blends of linear polymers and branched polymers. In order to yield a cured product having rubber elasticity, the organopolysiloxane should preferably be a linear polymer. In addition, it is preferred that the organopolysiloxane is terminated with a triorganosiloxy group, which may optionally contain one or more vinyl group bonded to the silicon atom, or a silanol group at both ends thereof.

The organopolysiloxane has a viscosity, at 25° C., of from 500 to 100,000 centipoises, preferably from 1,000 to 100,000 centipoises. When the viscosity is lower than 500 centipoises, the resultant cured product becomes unsatisfactory with respect to mechanical strength. On the contrary, when the viscosity exceeds 100,000 centipoises, the liquid silicone rubber base composition becomes too viscous with poor fluidity. In addition, the cured product obtained from such a composition does not exhibit good elasticity.

These organopolysiloxanes are obtained by any known procedures.

Specific examples of the organopolysiloxane include those of the following chemical formulas wherein n and m independently represent a positive integer.

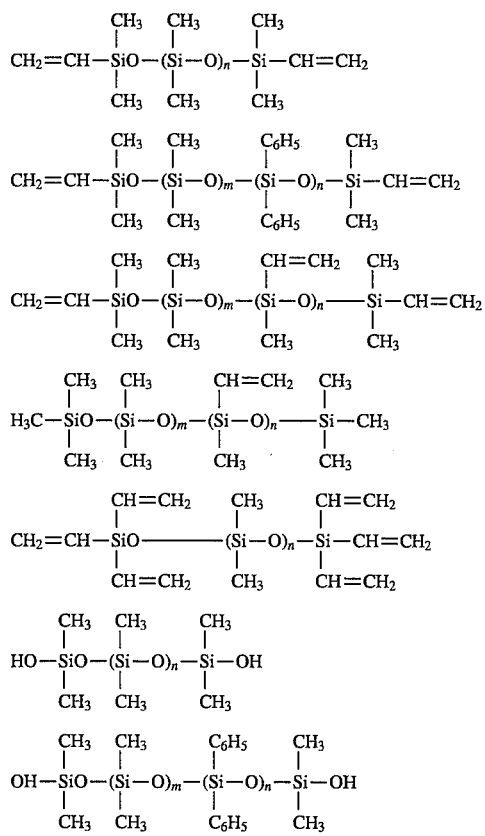

(B) Finely divided silica filler

The finely divided silica filler of ingredient (B) is added so as to impart intended hardness and strength to the cured silicone rubber composition obtained by curing of liquid silicone rubber base compositions of the invention. The silica filler should has a specific surface area of not smaller than 50 m$^2$/g, preferably from 50 to 400 m$^2$/g. Examples of the silica include fumed silica, precipitated silica, hydrophobicized silica and the like. Use of a silica filler having a specific surface area smaller than 50 m$^2$/g will make it difficult to uniformly disperse the filler in the organopolysiloxane. The silica filler has preferably a particle size not larger than 20 μm, preferably from 0.1 to 20 μm.

Formulation aids

In the practice of the invention, in order to obtain desired strength and physical properties, the liquid silicone rubber base composition may further comprise, aside from the above essential ingredients (A) and (B), silica fillers other than the silica filler of ingredient (B) and other known aids such as wetters or wetting agents. The silica fillers other than the silica filler of the ingredient (B) include quartz powder, diatomaceous earth and the like. Besides, calcium silicate may also be used. The wetters include alkylsilazanes such as hexamethyldisilazane, alkoxy group-containing organosilanes, polydimethylsiloxanes having a degree of polymerization not higher than 30 and terminated with a hydroxyl group at ends thereof. Where silazane compounds are used as the wetter, it is preferred to add a small amount of water. This is because the addition of water expedites wetting of the filler with the silazane.

Preparation of Liquid Silicone Rubber Base Composition

In the process of the invention, the base composition is prepared by mixing or kneading and thermally treating the organopolysiloxane (A) and the finely divided silica filler (B) according to the first to third steps defined hereinbefore. The kneaders or mixers used in the respective steps are not critical and include, for example, planetary mixers, kneader mixers and the like.

First step:

A part or portion of the organopolysiloxane (A) and the finely divided silica filler (B) are first mixed or kneaded at temperatures not higher than 80° C., preferably 5° to 80° C. and more preferably 20° to 70° C. In this first step, the silica filler (B) is uniformly dispersed in the organopolysiloxane (A) at a high concentration thereby obtaining a viscous mixture having an appropriate viscosity. When this step is carried out at temperatures higher than 80° C., firm interaction between the siloxane oil and the silica takes place. If the balance or the other portion of the organopolysiloxane (A) is added in the subsequent step in this condition, the resultant dispersion becomes microscopically inhomogeneous. This eventually leads to the unsatisfactory tear resistance of a cured product, which is obtained from a final rubber base composition, under cracked conditions of the product.

The ratio by weight of the ingredients (A) and (B) in this step should preferably be 30:70 to 70:30, more preferably 35:65 to 65:35. If the ratio of the ingredient (A) is smaller than 30:70, a homogeneous mass of the ingredients (A) and (B) may not be obtained. On the contrary, when the ratio exceeds 70:30, the viscosity of the resultant composition becomes so high that fluidity suitable for practical applications cannot be expected.

The mixing or kneading in the first step should be continued until uniform dispersion of the ingredient (B) in the ingredient (A) is attained. In general, the mixing time is in the range of from 20 to 80 minutes. Moreover, if formulation aids are optionally added, these aids may be mixed or kneaded along with the essential ingredients in this step.

Second step:

In the practice of the invention, the other portion of the organopolysiloxane (A) is added to the mixture obtained in the first step to provide a rubber base composition having a final, intended formulation thereof.

For this purpose, the mixture obtained in the first step and the balance or second portion of the organopolysiloxane (A) should be mixed or kneaded at temperatures not higher than 80° C., preferably from 5° to 80° C. and more preferably from 20° to 70° C. If the mixing is effected at temperatures higher than 80° C., the cured product obtained from the resultant rubber base composition becomes unsatisfactory with respect to the tear resistance under cracked conditions of the product for the same reason as with the first step.

The ratio by weight of the other portion of the organopolysiloxane (A) added in the second step and the initial portion of the organopolysiloxane (A) added in the first step should preferably be in the range of 30:70 to 70:30.

The mixing in the second step is continued until the portion of the ingredient (A) added in this step is uniformly dispersed in the mixture of the first step. In general, the mixing time is in the range of from 10 to 30 minutes.

Third step:

According to the process of the invention, the mixture obtained in the second step is subjected to thermal treatment at a temperature from 130° to 200° C., preferably from 140° to 170° C. By the thermal treatment, the finely divided silica filler of the ingredient (B) and the base polymer of the ingredient (A) are improved in affinity, thereby increasing the bonding force therebetween. As a consequence, the tear resistance of a cured product of the resultant composition in a cracked condition is significantly improved. For instance, when the thermal treatment temperature is lower than 130° C., the affinity between the ingredients (A) and (B) is not adequately improved, making it difficult to improve the tear resistance of the cured product. On the other hand, when the temperature exceeds 200° C., there will arise deficiencies such as the decomposition of the polymer and the formation of gel.

The thermal treatment is continued to an extent that the affinity between the ingredients (A) and (B) is significantly improved. More particularly, the heating time is generally in the range of approximately from 5 to 240 minutes, preferably from 60 to 120 minutes.

Liquid Silicone Rubber Base Composition

The liquid silicone rubber base composition prepared through the first to third steps not only has good fluidity, but also is significantly improved in the uniform dispersability of the finely divided silica filler and the affinity of the filler for the base polymer over known compositions. Hence, the cured product obtained from this composition conveniently exhibits good mechanical characteristics and a high tear resistance in a cracked condition of the cured product.

In practice, the liquid silicone rubber base composition is usually further mixed with known crosslinking agents and catalysts which are selected depending on the type of base polymer, i.e. organopolysiloxane of ingredient (A). The resultant curable composition has wide utility in the fields of electric and electronic industries, automobiles, office machines and medical appliances.

Curable Composition

For example, where an organopolysiloxane having at least two alkenyl groups as crosslinking sites in the molecule is provided as ingredient (A), a curable composition is of the addition curing type which comprises, as a crosslinking agent, an organohydrogenpolysiloxane having at least two hydrogen atoms bonded to a silicon atom and, as a catalyst, a platinum catalyst such as platinum, chloroplatinic acid, complexes of chloroplatinic acid and olefins, or the like. In this type of curable composition, the organohydrogenpolysiloxane provided as the crosslinking agent is generally added in an amount of 0.5 to 220 parts by weight per 100 parts by weight of the rubber base composition. Alternatively, the organohydrogenpolysiloxane may be added in such amounts that the ratio by mole between the hydrogen atom bonded to the silicon atom in the organohydrogenpolysiloxane, i.e. SiH group, and the alkenyl group in the ingredient (A) is in the range of 0.5 to 10:1. The platinum catalyst is used in an amount of 5 to 300 ppm when calculated as platinum. This curable composition is able to provide a cured product through thermal or room temperature curing.

On the other hand, when the ingredient (A) used consists of an organopolysiloxane having at least two hydroxyl groups, i.e. silanol groups, there are used, as the crosslinking agent, a hydrolyzable silane such as normal propyl orthosilicate, organotrialkoxysilanes, organotriaminoxysilane, organotriiminoxysilane, organotrialkenoxysilanes or partial hydrolyzates thereof, and catalysts ordinarily used for condensation-type room temperature. The resultant curable composition is of the curing-through-condensation type. In this curable composition, the crosslinking agent such as of a hydrolyzable silane is generally used in an amount of from 0.5 to 20 parts by weight per 100 parts by weight of the rubber base composition. Typical catalysts used for this purpose include metal salts of organic acids such as dibutyltin dilaurate, dibutyltin benzylmaleate and the like, titanic acid esters such as titanium tetraisopropylate, and the like. These catalysts are generally, used in an amount of from 0.01 to 10 parts by weight per 100 parts by weight of the organopolysiloxane. The condensation-type curable composition is condensed and cured at room temperature by contact with moisture in air to provide a cured product.

In the curable composition of either the addition type or the condensation type, there may be further added, aside from the crosslinking agents and catalysts, various types of known additives in order to impart intended strength and physical properties to cured products. Such additives include, for example, reaction inhibitors such as ethynylcyclohexanol, temperature-resisting agents, flame retarders, colorants and the like.

The curable composition is obtained by uniformly mixing the liquid silicone rubber base composition prepared according to the process of the invention and crosslinking agents, catalysts and, optionally, various types of additives. Especially, where a curable composition of the condensation type is prepared, it is favorable to mix the ingredients under moisture-free or shielded conditions.

The curable composition may be shaped into desired forms according to known molding techniques such as compression molding, injection molding, transfer molding and cast molding and subjected to addition or condensation curing depending on the type of composition, thereby providing cured products.

The present invention is more particularly described by way of examples, which should not be construed as limiting the invention thereto. Comparative examples are also shown. In the examples and comparative example, parts are by weight and the viscosity is a measurement at 25° C. The viscosities of organopolysiloxanes and liquid silicone rubber bases were measured by use of a Brookfield type viscometer of Tokyo Keiki K.K.

Evaluation tests were conducted as follows.

Evaluation Test of Physical Properties of Rubber

A 2 mm thick sheet was made using each of compositions of Examples and Comparative Examples and allowed to stand under conditions of 20° C. and 50 % R.H. for 7 days, thereby obtaining a cured rubber elastomer. Thereafter, The physical properties of the cured rubber elastomer including hardness, tensile strength, tear strength and elongation were determined on the basis of the methods described in JIS K6301. Among the physical properties of the rubber, the hardness and the tear resistance were, respectively, measured using an A-type hardness spring-type tester described in JIS K6301.

Evaluation Test of Tear Resistance in a Partially Cut Condition

A 2 mm thick sheet was cut into elongated pieces having a width of 10 mm, which were provided as samples. Each sample sheet was notched from one end thereof toward the inside with a length of 3 mm. Under conditions where the sheet was stretched by 30%, it was allowed to stand in an atmosphere of 105° C., after which the length of growth of a crack from the notch was observed. The length of growth of the crack was expressed as a depth of the crack immediately after the stretch by 30% and differences in the depth after passage over predetermined periods.

EXAMPLE 1

A dimethylpolysiloxane oil of the following formula containing a vinyl group at both ends thereof and having a viscosity of 10,000 centipoises (hereinafter referred to simply as Oil 1) was provided as ingredient (A)

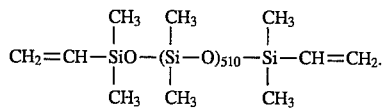

As ingredient (B), there was used fumed silica having a specific surface area of 300 m$^2$/g (commercially sold under the name of Aerosil 300 of Japan Aerosil Co., Ltd.).

50 parts of Oil 1, 45 parts of fumed silica, 10 parts of hexamethyldisilazane and 2 parts of water were fed to a kneader mixer and kneaded for one hour (first step).

Thereafter, 50 parts of Oil 1 was further added to the resultant mixture and kneaded for further 30 minutes (second step).

During the course of the kneading in the first and second steps, the temperature of the composition was so controlled as to be within a range of 20° C. to 60° C.

A heating medium was passed through the kneader mixer. The mixture obtained in the second step was thermally treated while kneading at 150° to 160° C. for 3 hours, thereby obtaining a liquid silicone rubber base composition (third step).

To 145 parts of the thus obtained liquid silicone rubber base composition were added 2 parts of methylhydrogenpolysiloxane crosslinking agent of the following formula

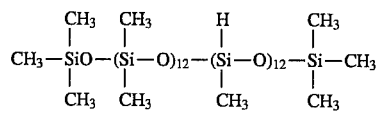

0.15 parts of a 2% chloroplatinic acid solution in 2-ethylhexanol, and 0.2 parts of ethynylcyclohexanol reaction inhibitor were further added, followed by curing at 120° C. for 10 minutes to obtain a 2 mm thick sheet. The thus obtained sheet was subjected to measurements of rubber physical properties and tear resistance. The results are shown in Tables 1 and 2.

EXAMPLE 2

The general procedure of Example 1 was repeated except that the formulation used in the first step includes 60 parts of Oil 1, 40 parts of fumed silica, 8 parts of hexamethyldisilazane, 2 parts of water and 20 parts of quartz power having a size of 5 μm and that 40 parts of Oil 1 was used in the second step, thereby obtaining a liquid silicone rubber base composition.

1.5 parts of methylhydrogenpolysiloxane as used in Example 1, 0.15 parts of a 2% chloroplatinic acid solution in 2-ethylhexanol and 0.2 parts of ethynylcyclohexanol were added to 160 parts of the liquid silicone rubber base composition, followed by curing under the same conditions as in Example 1 to obtain a 2 mm thick cured sheet. The sheet was subjected to measurements of rubber physical properties and tear resistance with the results shown in Tables 1 and 2.

EXAMPLE 3

A dimethylpolysiloxane oil of the following formula containing a hydroxyl group at both ends thereof and having a viscosity of 20,000 centipoises (hereinafter referred to simply as Oil 2) was provided as ingredient (A)

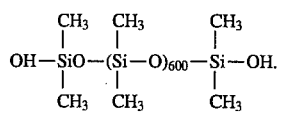

As ingredient (B), there was used fumed silica having a specific surface area of 200 m$^2$/g (commercially sold under the name of Aerosil 200 of Japan Aerosil Co., Ltd.).

45 parts of Oil 2 as ingredient (A), 25 parts of fumed silica used as ingredient (B), 5 parts of hexamethyldisilazane, 5 parts of dimethyldimethoxysilane and 2.5 parts of water were fed to a planetary mixer and kneaded for one hour (first step).

Thereafter, 60 parts of Oil 2 was further added to the resultant mixture and kneaded for further 30 minutes (second step).

During the course of the kneading in the first and second steps, the temperature of the composition was so controlled as to be within a range of from 20° to 60° C.

A heating medium was passed through the planetary mixer. The mixture obtained in the second step was thermally treated while kneading at 160° to 170° C. for 4 hours, thereby obtaining a liquid silicone rubber base composition (third step).

To 100 parts of the thus obtained liquid silicone rubber base composition were added 2 parts of n-propyl orthosilicate crosslinking agent and 0.6 parts of dibutyltin dilaurate catalyst, followed by curing at room temperature (25° C.) for 70 hours to obtain a 2 mm thick sheet. The thus obtained sheet was subjected to measurements of rubber physical properties and tear resistance. The results are shown in Tables 1 and 2.

Comparative Example 1

The first step of Example 2 was repeated, after which a heating medium was passed through a kneader mixer. The resultant mixture was kneaded at 150° to 160° C. for 1 hour, followed by further addition of 40 parts of Oil I and kneading for 2 hours, thereby obtaining a liquid silicone rubber base composition.

A 2 mm thick cured sheet was obtained from the liquid silicone rubber base composition in the same manner as in Example 2. The sheet was likewise subjected to measurements of rubber physical properties and tear resistance. The results are shown in Tables 1 and 2.

Comparative Example 2

The first step of Example 2 was repeated, after which a heating medium was passed through a kneader mixer. The resultant mixture was kneaded at 150° to 160° C. for 1 hour, after which it was allowed to cool down to room temperature. Thereafter, 40 parts of Oil 1 was further added to the mixture and kneaded at room temperature to obtain a liquid silicone rubber base composition.

A 2 mm thick cured sheet was obtained from the liquid silicone rubber base composition in the same manner as in Example 2. The sheet was likewise subjected to measurements of rubber physical properties and tear resistance. The results are shown in Tables 1 and 2.

Comparative Example 3

The ingredients as used in Example 1 were used. More particularly, 100 parts of Oil 1, 45 parts of fumed silica of ingredient (B), 10 parts of hexamethyldisilazane and 2 parts of water were fed to a kneader mixer and kneaded for 1 hour while controlling the temperature of the resultant composition at a level ranging from 20° C. to 60° C. While passing a heating medium through the kneader mixer, the kneaded composition was further kneaded at 150° to 160° C. for 3 hours to obtain a liquid silicone rubber base composition.

A 2 mm thick cured sheet was obtained from the liquid silicone rubber base composition in the same manner as in Example 2. The sheet was subjected measurements of physical properties and tear resistance. The results are shown in Tables 1 and 2.

Comparative Example 4

The first step of Example 3 was repeated, after which a heating medium was passed through a planetary mixer. The resultant mixture was kneaded at 160° to 170° C. for 4 hour, after which it was allowed to cool down to room temperature. Thereafter, 60 parts of Oil 2 was further added to the mixture and kneaded at room temperature to obtain a liquid silicone rubber base composition.

A 2 mm thick cured sheet was obtained from the liquid silicone rubber base composition in the same manner as in Example 3. The sheet was likewise subjected to measurements of rubber physical properties and tear resistance. The results are shown in Tables 1 and 2.

TABLE 1

| | Example 1 | Example 2 | Example 3 | Comp. Ex. 1 | Comp. Ex. 2 | Comp. Ex. 3 | Comp. Ex. 4 |
|---|---|---|---|---|---|---|---|
| Viscosity of Base (poises) | 6700 | 5500 | 1200 | 6300 | 5600 | 190,600 | 960 |
| Hardness | 50 | 46 | 35 | 46 | 45 | 50 | 33 |
| Tensile strength (kgf/cm$^2$) | 96 | 95 | 370 | 93 | 90 | 89 | 390 |
| Elongation (%) | 550 | 610 | 48 | 620 | 600 | 540 | 45 |
| Tear strength (kgf/cm) | 30 | 25 | 15 | 22 | 25 | 26 | 14 |

TABLE 2

| | Length of Grown Crack (mm) | | | | | | |
|---|---|---|---|---|---|---|---|
| Time After notching | Example 1 | Example 2 | Example 3 | Comp. Ex. 1 | Comp. Ex. 2 | Comp. Ex. 3 | Comp. Ex. 4 |
| 10 hours | 0 | 0 | — | 4.3 | 4.9 | 0 | — |
| one day | 0 | 0 | — | broken | broken | 0 | broken |
| two days | 0 | 0 | — | | | 1.3 | |
| three days | 0 | 0 | — | | | 5.7 | |
| five days | 0.2 | 0.1 | 0.8 | | | broken | |
| seven days | 0.2 | 0.2 | | | | | |

As will be apparent from the results of the tables, the liquid silicone rubber base compositions obtained according to the process of the invention can yield cured products having good tear resistance.

What is claimed is:

1. A process for preparing a liquid silicone rubber base composition which comprises (A) an organopolysiloxane of the following average compositional formula (1)

$$R_aSiO_{(4-a)/2} \quad (1)$$

wherein each R independently represents an unsubstituted or substituted monovalent hydrocarbon group and a is a value of from 1.95 to 2.05, said organopolysiloxane having a viscosity ranging from 500 to 100,000 centipoises at 25° C. and having at least two crosslinkable groups in the molecule, and (B) a finely divided silica filler dispersed in the organopolysiloxane and having a specific surface area not smaller than 50 m²/g, the process comprising:

the first step of mixing or kneading a first portion of the organopolysiloxane (A) of the average compositional formula (1) with the finely divided silica filler (B) at a temperature not higher than 80° C. until a uniform dispersion is obtained;

the second step of further mixing or kneading a second portion of the organopolysiloxane (A) of the average formula (1) with the resultant mixture at a temperature not higher than 80° C. until a uniform dispersion is obtained; and the third step of subjecting the mixture obtained in the second step to thermal treatment at a temperature of 130° C. to 200° C.

2. The process according to claim 1, wherein a ratio by weight between the first portion of said organopolysiloxane (A) in the first step and said finely divided silica filler is in the range of from 30:70 to 70:30.

3. The process according to claim 1, wherein a ratio by weight between the first portion of said organopolysiloxane (A) in the first step and the second portion of said organopolysiloxane (A) in the second step is in the range of from 30:70 to 70:30.

4. The process according to claim 1, wherein the first step is continued for a time of 20 to 80 minutes.

5. The process according to claim 1, wherein the second step is continued for a time of 10 to 30 minutes.

6. The process according to claim 1, wherein the third step is continued for a time sufficient to improve affinity between the organopolysiloxane (A) and the finely divided silica filler.

7. The process according to claim 6, wherein the time ranges from 5 to 240 minutes.

8. The process according to claim 1, further comprising, after the completion of the third step, adding a crosslinking agent and a platinum catalyst for crosslinkage, and curing the resultant composition to obtain a cured product.

9. A cured product obtained by curing the liquid silicone rubber base composition obtained by the process of claim 8.

* * * * *